US007887415B2

(12) United States Patent
Parham et al.

(10) Patent No.: US 7,887,415 B2
(45) Date of Patent: *Feb. 15, 2011

(54) RANDOM PAYOUT WHILE MAINTAINING THE PROGRESSIVE PRIZE POOL AT THE PREDETERMINED AVERAGE POOL SIZE

(75) Inventors: Tyler Thomas Parham, Reno, NV (US); Richard E. Michaelson, Reno, NV (US); William K. Bertram, Reno, NV (US)

(73) Assignee: Gaming Enhancements, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/929,820

(22) Filed: Oct. 30, 2007

(65) Prior Publication Data

US 2008/0102942 A1 May 1, 2008

Related U.S. Application Data

(60) Division of application No. 10/378,052, filed on Feb. 27, 2003, which is a continuation-in-part of application No. 09/916,424, filed on Jul. 25, 2001, now Pat. No. 6,996,610.

(60) Provisional application No. 60/437,426, filed on Jan. 2, 2003, provisional application No. 60/360,043, filed on Feb. 27, 2002, provisional application No. 60/220,488, filed on Jul. 25, 2000.

(51) Int. Cl.

| | |
|---|---|
| ***A63F 13/10*** | (2006.01) |
| ***G06F 19/00*** | (2006.01) |
| ***G06Q 50/00*** | (2006.01) |
| *A63F 13/12* | (2006.01) |
| *A63F 5/04* | (2006.01) |
| *G07F 17/34* | (2006.01) |

(52) U.S. Cl. .............................. 463/27; 463/25; 463/26

(58) Field of Classification Search ............. 463/12–28, 463/1, 40–42

See application file for complete search history.

(56) References Cited

U.S. PATENT DOCUMENTS 2,090,526 A 8/1937 Eaton (Continued)

FOREIGN PATENT DOCUMENTS

AU 2006244145 11/2006

(Continued)

OTHER PUBLICATIONS

Scarne, John; "Scarne's Encyclopedia of Card Games" Chapter 2-3; HarperCollins Publishers.

(Continued)

*Primary Examiner*—Peter DungBa Vo
*Assistant Examiner*—Matthew D. Hoel
(74) *Attorney, Agent, or Firm*—Brian N. Young; Fountainhead Law Group P.C.

(57) ABSTRACT

A method of providing a game for a gaming device using random payout from a prize pool, the game including a plurality of possible game outcomes, is provided. The method comprises: receiving, at the gaming device, a wager amount; receiving an input to initiate game play; and qualifying the wager amount to win a random award from the prize pool for each of at least two game outcomes from the plurality of game outcomes. A predetermined average pool size for the progressive prize pool is stored. A random payout is calculated using a function that calculates the random payout using a specified minimum amount, a specified maximum amount, and a specified average value. The specified average value is independently specified between the specified minimum value and specified maximum value. The random payout calculated by the function is included within the specified minimum amount and the specified maximum amount, wherein the function is configured to calculate random payouts that average over time substantially the specified average value. The random payout is provided where when the specified average value is set at an average contribution to the progressive prize pool, an average random payout over time is substantially equal to the average contribution to the progressive prize pool in order to maintain the progressive prize pool at the predetermined average pool size.

24 Claims, 1 Drawing Sheet

U.S. PATENT DOCUMENTS 2,217,394 A 10/1940 Wengel
2,393,622 A 1/1946 Adams
2,404,614 A 7/1946 Borst
2,470,738 A 5/1949 Bach
3,495,076 A 2/1970 Fettweis
4,332,389 A * 6/1982 Loyd et al. .................... 463/19
4,448,419 A 5/1984 Telnaes
4,582,324 A 4/1986 Koza et al.
4,837,728 A 6/1989 Barrie et al.
4,861,041 A 8/1989 Jones et al.
5,016,880 A 5/1991 Berge
5,042,810 A 8/1991 Williams
5,078,405 A 1/1992 Jones et al.
5,116,055 A 5/1992 Tracy
5,275,400 A 1/1994 Weingardt
5,280,909 A 1/1994 Tracy
5,324,035 A 6/1994 Morris et al.
5,332,219 A 7/1994 Marnell et al.
5,344,144 A 9/1994 Canon
5,364,104 A 11/1994 Jones et al.
5,401,023 A 3/1995 Wood
5,417,430 A 5/1995 Breeding
5,475,851 A 12/1995 Kodosky
5,481,740 A 1/1996 Kodosky
5,481,741 A 1/1996 McKaskle
5,483,444 A 1/1996 Heintzeman et al.
5,497,500 A 3/1996 Rogers
5,504,917 A 4/1996 Austin
5,544,893 A 8/1996 Jones et al.
5,573,244 A 11/1996 Mindes et al.
5,584,485 A 12/1996 Jones et al.
5,626,341 A 5/1997 Jones et al.
5,655,961 A 8/1997 Acres et al.
5,702,304 A 12/1997 Acres et al.
5,707,285 A 1/1998 Place et al.
5,727,786 A 3/1998 Weingardt
5,741,183 A 4/1998 Acres et al.
5,743,800 A 4/1998 Huard et al.
5,752,882 A 5/1998 Acres et al.
5,779,547 A * 7/1998 SoRelle et al. ................ 463/28
5,794,964 A 8/1998 Jones et al.
5,795,225 A 8/1998 Jones
5,816,918 A 10/1998 Kelly
5,820,459 A 10/1998 Acres et al.
5,836,817 A 11/1998 Acres et al.
5,842,921 A 12/1998 Mindes et al.
5,873,782 A 2/1999 Hall
5,876,284 A 3/1999 Acres et al.
5,885,158 A 3/1999 Torango et al.
5,911,418 A 6/1999 Adams
5,913,726 A 6/1999 Jones et al.
5,941,773 A 8/1999 Harlick
6,032,955 A 3/2000 Luciano et al.
6,045,130 A 4/2000 Jones et al.
6,062,981 A 5/2000 Luciano
6,070,878 A 6/2000 Jones et al.
6,073,930 A 6/2000 Jones et al.
6,089,976 A 7/2000 Schneider et al.
6,110,043 A * 8/2000 Olsen .......................... 463/27
6,139,430 A 10/2000 Huard et al.
6,146,270 A 11/2000 Huard et al.
6,146,273 A * 11/2000 Olsen .......................... 463/27
6,162,122 A 12/2000 Acres et al.
6,179,710 B1 1/2001 Sawyer et al.
6,210,276 B1 4/2001 Mullins
6,217,448 B1 * 4/2001 Olsen .......................... 463/25
6,224,482 B1 5/2001 Bennett
6,231,445 B1 5/2001 Acres
6,254,483 B1 7/2001 Acres
6,319,125 B1 * 11/2001 Acres .......................... 463/25
6,327,351 B1 12/2001 Walker et al.
6,336,859 B2 1/2002 Jones et al.
6,358,149 B1 3/2002 Schneider et al.
6,375,567 B1 4/2002 Acres
6,413,161 B1 7/2002 Baerlocher et al.
6,416,409 B1 * 7/2002 Jordan ......................... 463/27
6,434,534 B1 8/2002 Walker et al.
6,435,511 B1 8/2002 Vancura et al.
6,435,968 B1 8/2002 Torango
6,443,452 B1 9/2002 Brune
RE37,885 E 10/2002 Acres et al.
6,471,591 B1 * 10/2002 Crumby ....................... 463/26
6,475,088 B1 11/2002 Jones et al.
6,485,368 B2 11/2002 Jones et al.
6,506,116 B1 1/2003 Sunaga et al.
6,506,118 B1 1/2003 Baerlocher et al.
6,565,434 B1 5/2003 Acres
6,575,830 B2 6/2003 Baerlocher et al.
6,588,747 B1 7/2003 Seelig
6,589,114 B2 7/2003 Rose
6,589,115 B2 7/2003 Walker et al.
6,594,640 B1 7/2003 Postrel
6,599,192 B1 7/2003 Baerlocher et al.
6,599,193 B2 7/2003 Baerlocher et al.
6,602,137 B2 8/2003 Kaminkow et al.
6,609,974 B2 8/2003 Mead et al.
6,626,758 B1 9/2003 Parham et al.
6,634,946 B1 * 10/2003 Bridgeman et al. ........... 463/28
6,638,167 B1 10/2003 Sawyer et al.
6,656,048 B2 * 12/2003 Olsen .......................... 463/25
6,663,489 B2 12/2003 Baerlocher
6,666,766 B2 12/2003 Baerlocher et al.
6,687,679 B1 2/2004 Van Luchene et al.
6,712,693 B1 3/2004 Hettinger
6,712,695 B2 3/2004 Mothwurf et al.
6,719,632 B2 4/2004 Palmer et al.
6,726,563 B1 4/2004 Baerlocher et al.
6,733,386 B2 5/2004 Cuddy et al.
6,758,749 B2 7/2004 Krintzman
6,758,750 B2 7/2004 Baerlocher et al.
6,761,632 B2 7/2004 Bansermer et al.
6,776,711 B1 8/2004 Baerlocher
6,783,458 B2 8/2004 Mead et al.
6,786,819 B2 9/2004 Baerlocher et al.
6,793,579 B2 9/2004 Baerlocher et al.
6,796,905 B2 9/2004 Baerlocher et al.
6,811,483 B1 11/2004 Webb et al.
6,817,944 B2 11/2004 Kaminkow et al.
6,830,514 B2 12/2004 Meyer
6,852,027 B2 2/2005 Kaminkow et al.
6,852,030 B2 2/2005 Baerlocher et al.
6,905,407 B2 6/2005 Nordman
6,916,245 B1 7/2005 Vancura
6,960,133 B1 11/2005 Marks et al.
6,966,834 B1 11/2005 Johnson
6,971,955 B2 12/2005 Baerlocher et al.
6,979,263 B2 12/2005 Baerlocher et al.
6,985,879 B2 1/2006 Walker et al.
7,001,273 B2 2/2006 Baerlocher
7,001,278 B2 2/2006 Maya et al.
7,033,270 B2 4/2006 Baerlocher
7,040,982 B1 5/2006 Jarvis
7,056,210 B2 6/2006 Bansemer et al.
7,070,505 B2 7/2006 Vancura
7,121,943 B2 10/2006 Webb
7,169,044 B2 1/2007 Baerlocher et al.
7,172,506 B2 2/2007 Baerlocher et al.
7,270,604 B2 9/2007 Gerrard et al.
7,357,716 B2 4/2008 Marks et al.
7,392,224 B1 6/2008 Bauer et al.
7,430,521 B2 9/2008 Walker et al.
2001/0018361 A1 8/2001 Acres
2001/0036857 A1 11/2001 Mothwurf et al.
2001/0037243 A1 11/2001 Rouston et al.

| | | | |
|---|---|---|---|
| 2001/0039511 | A1 | 11/2001 | Duckworth |
| 2001/0049298 | A1 | 12/2001 | Bennett |
| 2001/0055990 | A1 | 12/2001 | Acres |
| 2002/0039923 | A1 | 4/2002 | Cannon |
| 2002/0058546 | A2 | 5/2002 | Acres |
| 2002/0169660 | A1 | 11/2002 | Taylor |
| 2003/0003989 | A1 | 1/2003 | Johnson |
| 2003/0013513 | A1 | 1/2003 | Rowe |
| 2003/0052452 | A1 | 3/2003 | Spur et al. |
| 2004/0002376 | A1 | 1/2004 | Swift |
| 2004/0078263 | A1 | 4/2004 | Altieri |
| 2005/0037829 | A1 | 2/2005 | Baerlocher et al. |
| 2005/0075889 | A1 | 4/2005 | Gomes et al. |
| 2005/0096113 | A1 | 5/2005 | Gabuchian |
| 2006/0089196 | A1 | 4/2006 | Parham |
| 2006/0160612 | A1 | 7/2006 | Parham |
| 2006/0205499 | A1 | 9/2006 | Jarvis |
| 2006/0205501 | A1 | 9/2006 | Jarvis |
| 2006/0211469 | A1 | 9/2006 | Jarvis |
| 2006/0277100 | A1 | 12/2006 | Parham |
| 2007/0298872 | A1 | 12/2007 | Gerrard et al. |
| 2008/0051194 | A1 | 2/2008 | Parham |
| 2008/0058096 | A1 | 3/2008 | Parham |
| 2008/0076543 | A1 | 3/2008 | Parham |
| 2008/0102942 | A1 | 5/2008 | Parham |
| 2008/0102943 | A1 | 5/2008 | Parham |
| 2009/0197674 | A1 | 8/2009 | Parham |

FOREIGN PATENT DOCUMENTS

| | | | |
|---|---|---|---|
| CN | 101283371 | A | 10/2008 |
| DE | 19812546 | | 1/2000 |
| EP | 0944030 | A2 | 9/1999 |
| JP | 54-074472 | A | 6/1979 |
| WO | 2004/060510 | A1 | 7/2004 |
| WO | 2006/066251 | A2 | 6/2006 |
| WO | 2006/122044 | | 11/2006 |

OTHER PUBLICATIONS

John Scarne "Scarne's Encyclopedia of Card Games," HarperCollins, chap. 2-3, 1973.

Cartwright et al., "The Statistical Distribution of the Maxima of a Randon Function," Proceedings of the royal Society of London, Series A, Mathematical and Physical Sciences, vol. 237, No. 1209, pp. 212-232, Oct. 9, 1956, downloaded from http://www.jstor.org/stable/1000074 on Apr. 14, 2010.

* cited by examiner

RANDOM PAYOUT WHILE MAINTAINING THE PROGRESSIVE PRIZE POOL AT THE PREDETERMINED AVERAGE POOL SIZE

CROSS REFERENCES TO RELATED APPLICATIONS

This application claims priority from both U.S. Provisional Application No. 60/360,043, entitled "Random Prize Pool Awarding Method", filed on Feb. 27, 2002 and U.S. Provisional Application No. 60/437,426, entitled "Randomly Generated Weighted Prize Pool Awarding Methods", filed on Jan. 2, 2003, and is a divisional of U.S. application Ser. No 10/378,052, filed Feb. 27, 2003 which is a Continuation-in-Part of U.S. application Ser. No. 09/916,242, entitled "Random Pay Gaming Method", filed on Jul. 25, 2001, which claims priority from U.S. Provisional Application No. 60/220,488, entitled "Random Pay Gaming Method", filed on Jul. 25, 2000, all of which are herein incorporated by reference in its entirety for all purposes.

BACKGROUND OF THE INVENTION

The present invention is related generally to gaming systems and more specifically to a gaming device system and method for awarding payouts and prizes.

Conventional gaming devices for awarding payouts when a wager is taken at a casino for example, are well known. A gaming device uses a random selection process to determine the game outcome of each play of a game. When a gaming device correctly displays at least one randomly predetermined set of indicia, the player is awarded a predetermined payout that is displayed in a payout schedule.

Conventional gaming devices have a top award called a jackpot that is limited by the probability of aligning a finite number of jackpot indicia. In order for a gaming device to remain profitable over time, the amount of awards multiplied by the probability of winning the awards is less than the average amount wagered in winning the awards. In order for a gaming device to payout a large predetermined jackpot, for example, $100,000, the odds of winning the jackpot must be extremely low in order for the machine to be profitable over time. Because of this, it normally takes long periods of time between large jackpot payouts. Even though players are still attracted to the opportunity of winning a $100,000 dollars, disadvantageously, because of the low frequency of winners and the extremely low probability of winning, players tend to lose interest in playing and tend to move on to games that have a higher frequency of winning a jackpot.

Conventional progressive gaming systems have been used to produce progressive pools, ranging from thousands to millions of dollars by using a progressive gaming system in conjunction with a gaming device or devices. In most of these systems, a number of gaming devices and/or location are coupled to a central computer system. As wagers are placed in the gaming devices, a portion of each wager is contributed to at least one progressive pool. As contributions are made to the progressive pool, the size of the pool grows until it is awarded to a player. When the player properly aligns a predetermined set of indicia on the gaming device the entire pool is paid. These progressive amounts are displayed on the gaming device and/or showcased on a display above the individual gaming device or a group of gaming devices.

While the above gaming devices and progressive gaming system with its added progressive pool have proved satisfactory in stimulating game play on the coupled gaming devices, disadvantageously, it has been observed that game play tends to decrease immediately after the total progressive pool has been won. Not until the displayed current pool value increases considerably above the initially reset base value does game play increase to its more usual levels. This fall-off in game play is a result of the players on the gaming devices being reluctant to institute game play when the displayed current pool value is close to the initial base value, since the players know that the value will likely increase to a more substantial level. Fall-off in game play at any time is undesirable and detracts from the benefits of the added progressive gaming system.

It should be noted that increased payoffs are being demanded by the market to maintain and increase player appeal. Nevertheless, the probability of win and payout that allows for a reasonable business profit must be assured to casino owners. Generally the profit-hold objectives before taxes and operational costs that are deducted are in a range as low as 2.7% and generally up to 15%. Hence, the higher payoffs for a winning indicia combination is counterbalanced with less probability for the high win combination of indicia.

Disadvantageously, the probability of hitting a large progressive award on a gaming device i.e., Mega Bucks/IGT "the worlds biggest slot Jackpot"™, is extremely low, thus causing long periods of time to pass by, between winners, of the large progressive award pools. Even though players are still attracted to the chance of winning over a million dollars, because of the low frequency of winners and the extremely low probability of winning, players tend to lose interest in playing and tend to move on to games that have higher odds frequency of winning jackpots.

In addition, progressive pools increase as wagers are placed in the gaming devices, a portion of each wager is contributed to at least one progressive pool. As contributions are made to the progressive pool, the size of the pool grows until it is awarded to a player. Because a portion of the wager from each gaming device is the only way to contribute to the progressive pool, when game play (coin-in) decreases the progressive pool increments at a slower rate, causing less excitement and player appeal. Disadvantageously, because of this and fall-off, progressive pools can remain stagnant for long periods of time creating a loss in revenues for the Gambling Establishments.

BRIEF SUMMARY OF THE INVENTION

Embodiments of the present invention generally relate to awarding random awards at a gaming device. In one embodiment, a method of providing a game for a gaming device using random payout from a prize pool, the game including a plurality of possible game outcomes, is provided. The method comprises: receiving, at the gaming device, a wager amount; receiving an input to initiate game play; and qualifying the wager amount to win a random award from the prize pool for each of at least two game outcomes from the plurality of game outcomes.

In another embodiment, a method of providing a game for a gaming device using random payout from a progressive prize pool, the game including a plurality of possible game outcomes, is provided. The method comprises: receiving, at the gaming device, a wager amount; receiving an input to initiate game play; and qualifying the wager amount to win a random award from the progressive prize pool and a total amount of the progressive prize pool.

In yet another embodiment, a method for providing random payout from a progressive prize pool is provided. The method comprises: storing a predetermined average pool size for the progressive prize pool; and providing a random payout such that an amount of an average random payout is equal to the average contributions to the progressive prize pool in order to maintain the progressive prize pool at the predetermined average pool size.

In another embodiment, a method for providing random payout from a progressive prize pool is provided. The method comprises: storing a predetermined average pool size for the progressive prize pool; receiving a wager amount; receiving an input to initiate game play; determining if the progressive prize pool is equal to the predetermined average pool size; if the progressive prize pool is equal to the predetermined pool size, qualifying the wager for a random payout such that an amount of an average random payout is equal to the average contributions to the progressive prize pool in order to maintain the progressive prize pool at the predetermined average pool size; and if the progressive prize pool is less than the predetermined pool size, qualifying the wager for a random payout such that an amount of an average random payout is less than the average contributions to the progressive prize pool in order to increase the progressive prize pool to the predetermined average pool size.

In another embodiment, a gaming network having a gaming device, a computing device and a prize pool containing a portion of wager amounts received at the gaming device, a method of awarding payouts from the prize pool is provided. The method comprises: receiving, by the gaming device, a wager amount; receiving an input to initiate game play; allocating a portion of the wager amount to the progressive prize pool; and qualifying the wager amount to win a random award, the random award being randomly selected, wherein the random award is determined using a function that awards random awards between a minimum value and a maximum value, wherein the random awards determined are substantially equal to an average value.

A further understanding of the nature and advantages of the present invention herein may be realized by reference to the remaining portions of the specification and the attached drawings. Reference to the remaining portions of the specification, including the drawing and claims, will realize other features and advantages of the present invention. Further features and advantages of the present invention, as well as the structure and operation of various embodiments of the present invention, are described in detail below with respect to the accompanying drawings. In the drawings, the same reference numbers indicate identical or functionally similar elements.

DETAILED DESCRIPTION OF THE INVENTION

Figure 1:
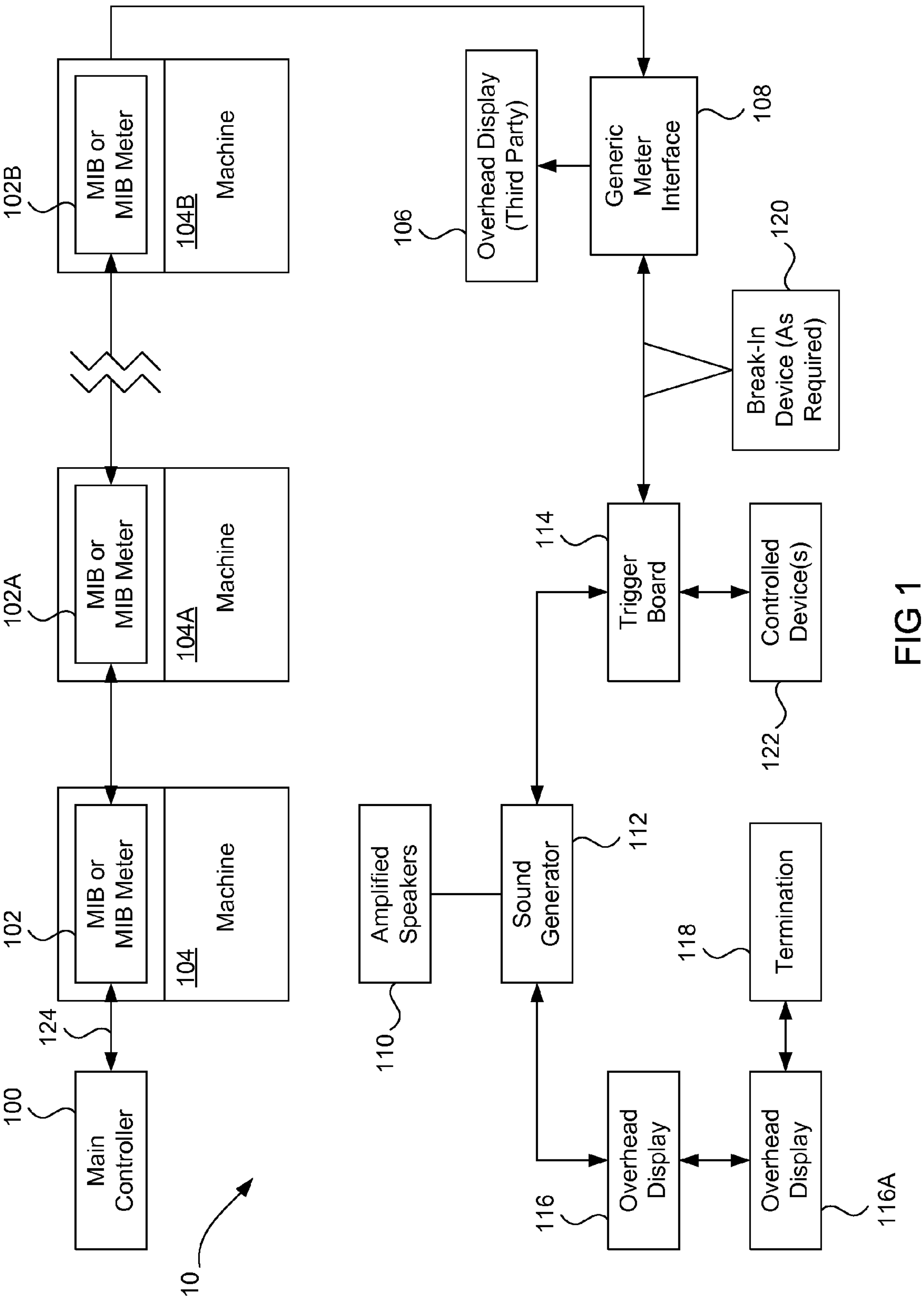
FIG. 1 is a block diagram of a conventional gaming system for awarding payouts and prizes, the system being modifiable as proves necessary for implementing the various embodiments of the present invention.

Various embodiments of the present invention are disclosed with the common thread being that once a player bets at least one proper wager amount and initiates game play. The player becomes eligible to win one or more (randomly selected monetary awards as a function of a random number from 0 to 100% of a prize pool) on any participating gaming device before, during or after game play with or without regard to game outcome. The prize pool may be fixed or progressive.

In a first embodiment of the present invention, RPGM (random pay gaming method) is implemented as part of any novel programmable electronic or computer-controlled gaming devices that offer a game payout, that can be used in conjunction with a typical networked gaming system. The novel gaming device, preferably has various output devices, including a display screen for displaying aspects of RPGM as described more thoroughly below. Other output devices may include audio outputs such as speakers, bells, whistles and the like, and signaling devices such as controllable lights and the like.

A number of types of input devices can be used by which the user can place wagers and/or play the game, including touch screen input devices, joysticks, mouse input devices, keyboards, buttons, levers and the like, as well as coin or currency acceptors and/or validators, card readers such as credit card readers, or other encoded-card readers. In a further embodiment, gaming terminals may be provided with communication devices, e.g., for purposes for accounting, maintenance, management, security, controls, updating and the like. It is common in the gaming industry to provide for novel gaming devices and those with skill in the art will understand how to construct and program such novel gaming devices to implement RPGM after reading and understanding the present descriptions.

FIG. 1 is a block diagram of a conventional gaming system 10 for awarding payouts and prizes. Among other components, gaming system 10 comprises a programmable controller 100; one or more gaming devices 104, 104A, 104B; one or more programmable Machine Interface Boards 102, 102A, 102B; one or more overhead displays 116, 116A or an existing display 106 with a generic display interface 108; an optional sound units 112; one or more trigger board units 114; and one or more "break in" devices 120 for system programming on the casino floor. Gaming system 10 may be utilized for implementing the present invention with various modifications as proves necessary to implement the invention.

In an alternate embodiment, the RPGM is implemented on one or more existing electronic or computer-controlled gaming devices. One or more gaming devices 104, 104A are coupled to a programmable controller 100 over a communication network 124, which could be any suitable serial or parallel bus arrangement. Indeed, any communication link 124 could be utilized under the method of the present invention and a programmable (controller) 100 could be located remotely from or within the gaming devices 104, 104A. At each gaming device 104 is a programmable machine interface board 102 that interfaces between the conventional electronic circuitry of gaming device 104 and the communication network 124.

In this embodiment, with a need for no more than relatively minor modifications, any conventional electronic or computer-controlled gaming devices e.g. video games, spinning reel slot games, keno games, live card games with tables interfacing with electronic equipment, Internet and/or networked games, etc. that receives bets in order to play a game at the machine is contemplated to be used, under the methods of the present invention. The design and operation of gaming devices is well known and conventional gaming machines are available such as from International Gaming Technology™ and Bally™. Modifications to previous gaming devices for use in accordance with embodiments of the present invention can include, e.g., providing graphics, instructions, harnessing, prize indications and the like to inform players how to play the game, meter displays, etc. Furthermore, the controller 100 can be any suitable computer-based controller.

Controller 100 used can be any of a number of different controllers and computer based processing systems. How controller 100 communicates with each gaming machine 104 over the communication network 124 is a matter of design choice and the protocols of communication are determined by the nature of the communication network 124 and the corresponding interface circuits.

Controller 100 may optionally be connected over communication link 124 to another computer system, not shown. Furthermore, the network 124 in some embodiments is a telecommunications network such as a phone link, intranet, Internet, satellite, etc. In these embodiments, the gaming devices are implemented as game software in personal computers which are located in remote locations such as hotel/motel rooms, homes, etc. It is common in the gaming industry to provide for electronic gaming devices which will be appreciated by those skilled in the art, how to construct and program such networked gaming systems to implement the RPGM according to the present invention after reading and understanding the present descriptions.

As noted, among other components, RPGM employs a gaming device 104, a Controller 100, and means of displaying a fixed or progressed distinct monetary prize pool amount on gaming device 104 and/or on the video screen (not shown) of gaming device 104 and/or showcased on a display 116 or 106 above the individual gaming device 104 or a group of gaming devices 104. Additional devices may be connected to generate sounds and indicators of win to stimulate play.

Any conventional means or any combination of any conventional means to display the entire amount of a monetary prize pool can be utilized under the method of the present invention which will be appreciated by those skilled in the art, such as in-game display meter video screen of gaming device 104, overhead display, plasma screen, etc.

Once a player bets the proper wager and initiates game play on any participating gaming device, the player becomes eligible to win one or more randomly selected monetary awards from the prize pool displayed. Any conventional eligibility requirements or any combination of any conventional eligibility requirements can be utilized under the method of the present invention which will be appreciated by those skilled in the art, such as rate of play, max wager, insertion of player cards, one or more predetermined indicia, separate wager bet, etc.

The Random Pay Gaming Method utilizes a random number generator located in a machine interface board, controller 100 or in the gaming device 104 to randomly select one or more monetary awards as a function of a random number from 0 to 100% of a fixed or progressed prize pool with or without regard to game outcome.

The monetary prize pool award that the player is eligible to win may or may not be displayed to the player prior to winning the prize pool award. For example, the prize pool award that the player is eligible to win can be display on the gaming devices monitor screen or in-game meter prior to winning the prize pool award. Or the prize pool award can be displayed as indicia and not be displayed until after the player selects the proper winning indicia.

In one embodiment in order to ensure player awareness, a predetermined amount minimum for the selected predetermined winning indicia for that gaming device is displayed. An award table and/or conventional display means on gaming device 104 always shows a predetermined minimum amount for the player. Once the player bets the proper wager an additional amount determined by a random number generator is displayed on a separate conventional display or added to the conventional display showing the minimum amount on the gaming device. The predetermined minimum amount is the amount of the gaming devices predetermined payout for the selected predetermined winning set of indicia, but a player also has the opportunity to win a bonus that is a randomly selected award from the prize pool.

In another embodiment the monetary prize pool award that the player is eligible to win is not displayed to the player until after the player has achieved a winning game outcome or completed certain bonus mode criteria. If the player wins a prize pool award, the payout, can be "paid out" by any conventional payout means which will be appreciated by those skilled in the art, such as by gaming device 104 through a currency chute or by increasing the amount of winnings shown in a credit window (not shown) of a gaming device and/or a hand pay by an attendant, etc. As noted, the prize pool may be fixed or progressive.

If the prize pool is fixed, a predetermined minimum and maximum prize pool awards and a predetermined balancing point (average award) are stored in controller 100. In order for the controller 100 to calculate the randomly selected average awards in the range of 0 to 100% of the prize pool.

If the prize pool is progressive, a controller 100 calculates the randomly selected average progressive awards from a minimum to the maximum of the progressive prize pool, so that the average progressive awards are less than or equal to the average progressive contributions to the progressive prize pool in order for the progressive prize pool to increase to a larger size before the entire progressive prize pool is won.

If the prize pool is progressive, controller 100 increments a predetermined percentage of each gaming wager from one or more gaming devices and/or a percentage of non-gaming revenues e.g., rooms, food, beverage, etc., to the total progressive prize pool amount.

If the player wins a progressive prize pool award, the amount of the progressive prize pool won is deducted from the amount showing on the progressed prize pool display. The amount not won from the progressive prize pool remains displayed and the amount not won is carried over for the next opportunity to win an award from the progressive prize pool. The progressive prize pool is reset to a predetermined monetary base value only after a player wins 100% of the prize pool.

If gaming devices with different pay tables and/or denominations are playing for the same prize pool awards, main controller 100 will also store hit frequency and wager information from each gaming device 104 coupled to the networked gaming system so that the award algorithm will display amounts that average properly for each machine.

When the RPGM is used on an existing gaming device that already has a predetermined pay table, in order for the RPGM to function properly, a predetermined prize pool top award (maximum), a predetermined minimum award, and a predetermined balancing point (average award) are stored in controller 100. In order for the controller 100 to calculate the randomly selected average awards in the range of 0 to 100% of the entire prize pool, the percentage of the prize pool awarded is a function of a random number such that the average prize pool awarded over a number of plays equals the designed jackpot award of gaming device 104 being played.

For example, a gaming device has a designed top award of $10,000, a minimum jackpot pay amount of $5,000 and a jackpot pool amount of $100,000. I order for the sum of the minimum jackpot amount ($5,000) and the average pool award to equal the designed jackpot award of $10,000, the sum of expectations of jackpot pool awards above $5,000 must equal the sum of expectations of jackpot pool awards below $5,000 in order for the designed pay table award of $10,000. Expectation is the product of the amount awarded times the probability of winning that award as defined by the random number generator.

A method of calculating a percentage of jackpot pool is such that the percentage in the range [0%-100%] is a function f(x) of a random number x in an interval [0,1]. The function f(x) is such that for some value p in the interval [0,1], the sum of expectations for awards f(x) for values of x less that p must equal the sum of expectations for awards f(x) for values of x greater than p and the value of f(p) must equal the desired average jackpot award. Expectations may be defined by discrete values in a table of award percentages or a continuous function may be used.

The function $f(x)=ae^{-cx}$ meets these requirements for appropriate values of a and c. For example, if a=102*JPavg and c=199 a maximum jackpot of 102 times average may be offered. A value greater than JPavg will be offered as a bonus whenever the random number x is less than 0.0266. Although not shown, one of ordinary skill in the art will understand that other functions consistent with the scope and spirit of the present invention may be utilized. For example, a function may include at least two parameters and is normalized over an interval of desired award values. In one example, an exponential weighted function, A exp(−B J), where A and B are parameters and J is the random award value, is provided. A minimum value of a desired award, a maximum value of the desired award, and an average value is specified and stored. Using these values, the parameters of the weighted function can be calculated, i.e., the values of A and B in the above function.

Now that the weighted function is determined, a weighted random award value is determined between the minimum and maximum values specified, and whose value over time will result in an average value that agrees with the above specified average value. In this embodiment, these random award values may be chosen by picking a random number that yields a random value award J between the minimum and maximum values.

Unlike conventional gaming devices, the above function allows award of jackpots that are larger than the pay table was originally designed to pay when used with existing gaming devices.

In an alternate embodiment, the player invests the required amount into gaming device 104 and initiates game play. At the time gaming device 104 receives the required wager amount to qualify the player for the prize pool award, a controller 100 calculates a randomly selected monetary award amount of the prize pool and this amount is displayed on gaming device 104 for this play only. If gaming device 104 based on its internal workings, selects the proper predetermined set of winning indicia the player is awarded a predetermined amount minimum for the selected predetermined winning set of indicia. Furthermore, the player is also rewarded the award of the prize pool amount displayed on gaming device 104. If gaming device 104 does not select the proper predetermined set of winning indicia to win the prize pool amount displayed on gaming device 104. The display on gaming device 104 will change to the minimum amount for that machine and/or display various attractions to stimulate game play.

In one embodiment a prize award is selected from at least one prize pool. The prize award selected is then divided into two or more prize points and/or awards. The two or more prize points and/or awards are then displayed as items in a secondary video game (SVG) for the player(s) to win and/or lose. After the SVG comes to an end, the prize awards won are subtracted from the prize pool and the SVG will provide means through a computer system for the player(s) to verify and collect the prize points and/or awards won.

In another embodiment when the player invests the required wager amount into a video gaming device (not shown) and initiates game play, the player becomes eligible to win one or more progressive bonus awards from a randomly selected bonus award of the progressive prize pool with or without regard to game outcome. In this embodiment, a novel feature is that the bonus awards, non-bonus awards and game terminators are displayed as indicia and randomly appear and disappear and/or move across the video monitor screen and the player has the opportunity to win the awards by touching and exposing (through video touch screen technology) as many of the indicia as possible before the bonus award cycle ends and/or the player touches a bonus cycle terminator.

When a controller 100 increments to the progressive prize pool one or more predetermined monetary amounts of contribution from one or more video gaming devices and/or non-gaming revenues, main controller 100 triggers a bonus cycle. Controller 100 then randomly selects one monetary bonus award from the prize pool and divides it into one or more bonus awards, then randomly selects one or more non-bonus awards and randomly selects 0 or more bonus cycle terminators.

Once controller 100 has randomly selected one or more bonus awards and has selected one or more non-bonus awards and has selected 0 or more bonus cycle terminators, controller 100 detects which of the video gaming devices on the networked gaming system has received the required wager amount. Once controller 100 has identified the qualified video gaming machines, controller 100 then randomly selects at least one of the qualified video gaming devices on the network gaming system for a random bonus cycle. After controller 100 has selected at least one of the qualified video gaming device, controller 100 transfers this information to the properly programmed video gaming device and triggers and bonus cycle for at least one gaming device.

The properly programmed video gaming device then displays the bonus award percentages, non-bonus awards, and game terminators as indicia (e.g., card back, ducks, balloons, etc.). Gaming device 104 then resumes the bonus cycle and the disguised indicia randomly appear and disappear and/or move across the video monitor screen, before, during or after game play. The rate of speed that the disguised indicia randomly appear and disappear and/or move across the video monitor screen is a pre-selected rate that is stored in the video gaming machine. As the indicia randomly appear and disappear and/or move across the video monitor screen, the player has the opportunity to win the disguised bonus awards by touching and exposing (through video touch screen technology) as many of the bonus indicia as possible before the bonus award cycle ends and/or the player touches a bonus cycle terminator. The bonus awards exposed by the player on the gaming machines video screen are awarded to the player once the bonus cycle comes to an end. The bonus awards won are then deducted from the total amount of the progressed prize pool.

The bonus cycle comes to an end once the randomly selected indicia all disappear from the gaming machines video screen. The bonus cycle comes to an end also when a bonus cycle terminator is exposed. The bonus cycle comes to an end also when a player exposes a bonus award that is 100 percent of the entire prize pool. Once a player wins 100 percent of the progressed prize pool, the prize pool will be reset to a predetermined monetary base value. The bonus cycles have no effect on gaming device 104's normal game play outcome.

In another embodiment the player provides the required amount into a video gaming device and initiates game play. If gaming device 104 based on its internal workings, selects one or more predetermined winning indicia, the player qualifies for a secondary bonus game. The bonus game works similar to the bonus game described above except for, the indicia that are displayed on gaming device 104 are static. For example, five card back are displayed on gaming device 104, which are disguising the randomly selected bonus awards, non-bonus awards and game terminators. At this time the player has the opportunity to select and expose the bonus awards, non-bonus awards and game terminators. The bonus cycle come to an end once all the card backs are exposed or the player selects a game terminator or 100% of the entire bonus prize pool is won. The player is awarded the bonus awards once the bonus game comes.

In a further embodiment of the one just described above, once the player has qualified for a bonus award for example, the five card backs are displayed to the player for selection. The player is given the option to bet on one or more opportunities to win a bonus prize pool award. If the player chooses to bet a predetermined wager on extra bonus opportunities, then five more card backs are displayed with the other five card back. This process is carried on until the player decides to quite betting or reaches a set limit to the number of bonus opportunities available. Once the player is ready to begin the bonus game. The player can select any of the card backs in any order that the player desires. The bonus cycle come to an end once all the card backs are exposed or the player selects a game terminator or 100% of the entire bonus prize pool is won. The player is awarded the bonus awards once the bonus game comes to an end through conventional means.

Yet in a further embodiment, when the player has qualified for a bonus award, each time the player bet on the opportunities to win another bonus prize pool award, the total percentage of previous bonus prize pool opportunity is shown to the player. The player has a chance to see what the total percentage of the prize pool hidden behind the disguised indicia is before trying to win it.

In one embodiment, controller 100 may provide random awards generated from a prize pool, such as a progressive prize pool. When a gaming device 104 receives a wager and game play is initiated, the wager is qualified for a random award from the prize pool. The random awards may be generated where an average prize pool of the prize pool is maintained at a predetermined average pool size. Thus, once the average prize pool is at the predetermined average pool size, the average prize pool is maintained. In one embodiment, the average pool size is maintained by making the average random award equal to the average contribution rate over a number of game plays. In one embodiment, the random awards are awarded based on functions provided above. The average award is governed by the function and the contribution rate may be set at the average award.

The average prize pool, however, may not always be at the predetermined average pool size. For example, the average prize pool at a time of play, such as right after the entire prize pool has been won, may be less than the predetermined average prize pool. In this case, the average random award over a number of game plays can be less than the contribution rate. The average prize pool will then increase until the predetermined prize pool size is reached. The average prize pool may then be maintained at the predetermined prize pool size.

The above method continuously maintains the prize pool at a average prize pool amount in addition to determining random awards of all sizes. Also, no initial start amount for the prize pool is required because the prize pool will increase while still providing random awards.

In another embodiment, controller 100 provides random awards for at least two game outcomes from a single prize pool, such as a progressive prize pool. When a wager is received at gaming device 104 and game play is initiated, the wager amount is qualified to win a random award for at least two game outcomes. The game may include any number of game outcomes. For example, game outcomes for a video poker game include a royal flush outcome, straight flush outcome, four of a kind outcome, etc. Each game outcome may have a random weighted award associated with it.

In one embodiment, the random weighted award for each game outcome is determined in a way that keeps the average pool size at a predetermined pool size. As mentioned above, the parameters of a weighted function may be determined so that the average value of the random awards equals the average contribution to the prize pool when the prize pool is at the predetermined pool size. In the case where random awards are given for multiple outcomes, different outcomes have different contribution rates to the single prize pool. The average value of the random award for each outcome is determined by taking the taking the ratio of the desired pool size to the average contribution for that outcome. For example, if there are three outcomes that have different contribution rates, by dividing up the three random awards equally gives the average award as: (⅓)*Pool Size/contribution rate. If the contribution rate is different for each outcome, then the average random award for each outcome will be different using the above formula. This will then maintain the average pool size at the desired value. Although the above formula is discussed, it will be understood that other methods of determining the average random award for each outcome may be used.

In another embodiment, the average random awards for each outcome may be randomly distributed among outcomes. For example, the average random award for a straight flush may be randomly used for a random award for a four-of-a-kind. In this case, the four-of-a-kind average random award would be larger because the average random award for a straight flush is larger than for a four-of-a-kind.

If these random awards are then randomly distributed among all outcomes, the average pool size cannot be guaranteed to stay the same because ultimately if larger average random awards are used for typical average random awards for the outcome, the contribution rates will be lower than the average random awards. Thus, a two-step algorithm including a normal mode and random mode is used. The normal mode is where average random awards will be less than the contribution rate thereby letting the pool increase. The random mode is where random average awards for outcomes are random, which may cause the pool to decrease. In one example, controller 100 would operate in the normal mode until the pool exceeds a preset size at which time the random mode would start and distribute the awards randomly. If and when the pool drops below another preset value, the normal mode would then begin and build the pool back up.

In yet another embodiment, controller 100 provides a single prize pool, such as a progressive prize pool, that includes at least two outcomes. One outcome provides an opportunity for a player to win at least one random award (there may be an opportunity to win multiple random awards) from the single prize pool and another outcome provides the player with an opportunity win a total amount (100%) of the single prize pool. The total amount is a non-random win. For example, a royal flush will win the total amount of the pool and other outcomes, such as a straight flush, four-of-a-kind, etc., will win a random amount within the ranges specified from the same prize pool. Thus, in the case of a progressive prize pool, when gaming device 104 receives a wager and game play is initiated, the wager is qualified for a chance to win the entire progressive amount of the progressive prize pool if a certain outcome is received and is given a chance to win at least one random award if another certain outcome is received.

In the case of the progressive prize pool, the random awards provided may be set where the average contribution to the prize pool is greater than the average random award to allow the progressive prize pool to increase until the total amount is won. Also, in another embodiment, as described above, the prize pool may be maintained at a predetermined level. In one embodiment, in order to determine the average 100% award, the following calculation may be used. Let n1 be the average number of games needed to hit the whole pool, and n2 be the average number of games for the random award. If the average contribution to the pool during these n2 games is C and the average random award is A, then C−A is the average contribution during these games. So the pool will continue to grow and will result in an average 100% award of (n1/n2)*(C−A). This means that the average random award is fixed by the parameter selection of the function used, and will stay the same regardless of the pool size.

While the above is a complete description of exemplary specific embodiments of the invention, additional embodiments are also possible. For example, the RPGM may relate to any novel or conventional electronic or computer-controlled gaming devices e.g. video games, spinning reel slot games, keno games, etc that offer a primary game payout and a secondary prize pool payout that can be used in conjunction with a typical networked gaming system, and may be used for a promotional device, state lottery or non-gaming environment for prize give a ways. Thus, the above description should not be taken as limiting the scope of the invention, which is defined by the appended claims along with their full scope of equivalents.

What is claimed is:

1. A method for providing a random payout from a progressive prize pool, the method comprising:

storing, in memory of a computing device, a predetermined average pool size for the progressive prize pool;

calculating, by the computing device, a random payout using a function that calculates the random payout using a specified minimum amount, a specified maximum amount, and a specified average value, the specified average value being independently specified between the specified minimum value and specified maximum value, wherein the random payout calculated by the function is included within the specified minimum amount and the specified maximum amount, wherein the function is configured to calculate random payouts that average over time substantially the specified average value; and providing the random payout, wherein when the specified average value is set at an average contribution to the progressive prize pool, an average random payout over time is substantially equal to the average contribution to the progressive prize pool in order to maintain the progressive prize pool at the predetermined average pool size.

2. The method of claim 1, wherein the specified average value comprises a first specified average value, the method further comprising:

determining if the progressive prize pool is at the predetermined average pool size;

if the progressive prize pool is less than the predetermined average pool size, calculating the random payout using the function with a second specified average value less than the average contribution such that the average random payout over time is less than the average contribution to the progressive prize pool in order to increase the progressive pool size to the predetermined average pool size.

3. The method of claim 2, wherein the second specified average value is changed to the first specified average value when the predetermined pool size is reached.

4. The method of claim 1, further comprising:

providing a game including a plurality of game outcomes, wherein each game outcome includes a different contribution rate to the prize pool; and determining a plurality of specified average values for the plurality of game outcomes such that the average random payout for the plurality of game outcomes over time is equal to the average contribution to the progressive prize pool for the plurality of game outcomes in order to maintain the progressive prize pool at the predetermined average pool size.

5. The method of claim 4, wherein the specified average value for a game outcome in the plurality of game outcomes is determined based on the predetermined average pool size and a contribution rate for the game outcome.

6. The method of claim 5, wherein the specified average value for the game outcome is determined by taking a ratio of the predetermined average pool size to the contribution rate for the game outcome.

7. The method of claim 4, wherein each game outcome in the plurality of game outcomes includes a different specified average value.

8. The method of claim 1, wherein the function comprises at least two parameters that are determined by the specified minimum value, specified maximum value, and the specified average value.

9. The method of claim 8, wherein the at least two parameters are determined such that the average random payout over time is equal to the average contribution to the progressive prize pool when the progressive prize pool is at the predetermined average pool size.

10. The method of claim 1, wherein the function is a continuous function that calculates the random payout in a continuous range of values from the specified minimum value to the specified maximum value.

11. A system for providing a random payout from a progressive prize pool, the system comprising:

a storage medium configured to store a predetermined average pool size for the progressive prize pool; and a gaming device configured to:

calculate the random payout using a function that calculates the random payout using a specified minimum amount, a specified maximum amount, and a specified average value, the specified average value being independently specified between the specified minimum value and specified maximum value, wherein the random payout calculated by the function is included within the specified minimum amount and the specified maximum amount, wherein the function is configured to calculate random payouts that average over time substantially the specified average value; and provide the random payout, wherein when the specified average value is set at an average contribution to the progressive prize pool, an average random payout over time is equal to the average contribution to the progressive prize pool in order to maintain the progressive prize pool at the predetermined average pool size.

12. The system of claim 11, wherein the specified average value comprises a first specified average value, the system further comprising a controller comprising logic executable to:

determine if the progressive prize pool is at the predetermined average pool size; and if the progressive prize pool is less than the predetermined average pool size, logic executable to calculate the random payout using a second specified average value less than the average contribution to the progressive prize pool such that the average random payout over time is less than the average contribution to the progressive prize pool in order to increase the progressive pool size to the predetermined average pool size.

13. The system of claim 12, wherein the controller is coupled to the gaming device through a network.

14. The system of claim 12, wherein the gaming device includes the controller.

15. An apparatus configured to provide a random payout from a progressive prize pool, the apparatus comprising:

one or more computer processors; and logic encoded in one or more computer readable storage media for execution by the one or more computer processors and when executed is executable to:

determine a predetermined average pool size for the progressive prize pool;

calculate the random payout using a function that calculates the random payout using a specified minimum amount, a specified maximum amount, and a specified average value, the specified average value being independently specified between the specified minimum value and specified maximum value, wherein the random payout calculated by the function is included within the minimum amount and the maximum amount, wherein the function is configured to calculate random payouts that average over time substantially the specified average value; and p1 provide the random payout, wherein when the specified average value is set at an average contribution to the progressive prize pool, an average random payout over time is equal to the average contribution to the progressive prize pool in order to maintain the progressive prize pool at the predetermined average pool size.

16. The apparatus of claim 15, wherein the specified average value comprises a first specified average value, wherein the logic when executed is further executable to:

determine if the progressive prize pool is at the predetermined average pool size;

calculate the random payout using the function with a second specified average value less than the average contribution such that the average random payout over time is less than the average contribution to the progressive prize pool in order to increase the progressive pool size to the predetermined average pool size if the progressive prize pool is less than the predetermined average pool size.

17. The apparatus of claim 16, wherein the second specified average value is changed to the first specified average value when the predetermined pool size is reached.

18. The apparatus of claim 15, wherein the logic when executed is further executable to:

provide a game including a plurality of game outcomes, wherein each game outcome includes a different contribution rate to the progressive prize pool; and determine a plurality of average values for the plurality of game outcomes such that the average random payout for the plurality of game outcomes over time is equal to the average contribution to the progressive prize pool for the plurality of game outcomes in order to maintain the progressive prize pool at the predetermined average pool size.

19. The apparatus of claim 18, wherein the specified average value for a game outcome in the plurality of game outcomes is determined based on the predetermined average pool size and a contribution rate for the game outcome.

20. The apparatus of claim 19, wherein the specified average value for the game outcome is determined by taking a ratio of the predetermined average pool size to the contribution rate for the game outcome.

21. The apparatus of claim 18, wherein each game outcome in the plurality of game outcomes includes a different specified average value.

22. The apparatus of claim 15, wherein the function comprises at least two parameters that are determined by the specified minimum value, specified maximum value, and the specified average value.

23. The apparatus of claim 22, wherein the parameters are determined such that the amount of the average random payout over time is equal to the average contribution to the progressive prize pool when the progressive prize pool is at the predetermined average pool size.

24. The apparatus of claim 15, wherein the function is a continuous function that calculates the random payout in a continuous range of values from the specified minimum value to the specified maximum value.

* * * * *